US012591884B2

(12) United States Patent
Deliwala et al.

(10) Patent No.: US 12,591,884 B2
(45) Date of Patent: *Mar. 31, 2026

(54) SECURED ACCOUNT PROVISIONING AND PAYMENTS FOR NFC-ENABLED DEVICES

(71) Applicant: American Express Travel Related Services Company, Inc., New York, NY (US)

(72) Inventors: Manish K. Deliwala, Chandler, AZ (US); Varaprasad Kotha, Phoenix, AZ (US); Ajay Babu Maddukuri, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/512,869

(22) Filed: Nov. 17, 2023

(65) Prior Publication Data

US 2024/0086907 A1     Mar. 14, 2024

Related U.S. Application Data

(63) Continuation of application No. 17/523,085, filed on Nov. 10, 2021, now Pat. No. 11,861,605, which is a
(Continued)

(51) Int. Cl.
*G06Q 20/38* (2012.01)
*G06Q 20/32* (2012.01)

(52) U.S. Cl.
CPC ....... *G06Q 20/3829* (2013.01); *G06Q 20/322* (2013.01); *G06Q 20/3278* (2013.01); *G06Q 20/3821* (2013.01); *G06Q 20/385* (2013.01)

(58) Field of Classification Search
CPC ............................................ G06Q 20/00–425
See application file for complete search history.

(56) References Cited

U.S. PATENT DOCUMENTS

| 9,167,425 B1 * | 10/2015 | McDonald | ........... G06Q 20/382 |
| 10,009,179 B2 * | 6/2018 | Acar | ........................ H04L 9/30 |

(Continued)

OTHER PUBLICATIONS

International Search Report and Written Opinion dated Jan. 15, 2019 for PCT Patent Application No. PCT/US2018/059654.
(Continued)

*Primary Examiner* — Chenyuh Kuo
(74) *Attorney, Agent, or Firm* — Thomas I Horstemeyer, LLP

(57) ABSTRACT

Systems, methods, and articles of manufacture for secured account provisioning and payments using user computing devices are provided. One such method comprises receiving, by a user computing device, a payment request from a point of sale terminal; obtaining, by the user computing device, a storage encryption (ENC) key based on at least a device fingerprint of the user computing device and a storage root key; obtaining, by the user computing device, an encrypted account payload from a secure database of the user computing device; decrypting, by the user computing device, the encrypted account payload using the storage ENC key, wherein the decrypted account payload includes a payment credential; and transmitting, by the user computing device, the payment credential to the point-of-sale terminal.

20 Claims, 4 Drawing Sheets

Related U.S. Application Data continuation of application No. 15/810,416, filed on Nov. 13, 2017, now Pat. No. 11,182,780.

(56) References Cited

U.S. PATENT DOCUMENTS

| | | | |
|---|---|---|---|
| 10,218,697 | B2 | 2/2019 | Cockerill et al. |
| 10,243,958 | B2 | 3/2019 | Chandoor et al. |
| 10,461,933 | B2 | 10/2019 | Le et al. |
| 10,607,212 | B2 * | 3/2020 | Sheets ................ G06Q 20/3829 |
| 11,960,589 | B2 * | 4/2024 | Ollivier ................... G06F 21/57 |
| 12,100,003 | B2 * | 9/2024 | Collinge ............ G06Q 20/4012 |
| 2009/0016537 | A1 * | 1/2009 | Ju .................... H04N 21/25816 |
| | | | 380/278 |
| 2013/0110658 | A1 | 5/2013 | Lyman et al. |
| 2013/0111571 | A1 | 5/2013 | Jakobsson et al. |
| 2015/0154596 | A1 | 6/2015 | Collinge et al. |
| 2016/0092692 | A1 | 3/2016 | Iwahashi et al. |
| 2016/0218875 | A1 * | 7/2016 | Le Saint ............... H04L 9/0822 |
| 2017/0061272 | A1 | 3/2017 | Deliwala et al. |
| 2017/0289139 | A1 | 10/2017 | Guo et al. |
| 2018/0174138 | A1 * | 6/2018 | Subbarayan ......... G06Q 20/385 |

OTHER PUBLICATIONS

Mendez, HandBook of Applied Cryptography (year: 1996).
Candramouli, NIST.IR.7956 (Year: 2013).
Dasgupta, Performance Analysis of Broadcast Authentication (Year: 2006).

Brian Russell, Practical Internet of Things Security ( Year: 2016).
Stack Exchange, public key—Digital Signature using symmetric key cryptography—Cryptography Stack Exchange (Year: 2015).
"Message Authentication Code (MAC)," entry in the glossary of the Computer Security Resource Center of the National Institute of Standards and Technology, available online at csec.nist.gov/glossary/term/message-authenication-code (Year: 2019).
3.1 creating the AES root key. Intel. (n.d.). Retrieved Apr. 26, 2023, from https://www.intel.com/content/www/us/en/docs/programmable/683823/22-3/creating-the-aes-root-key-s10-fm-dm.html (Year: 2023).
Acar, T., & Benaloh, J. (2016). Practical Aspects of Modern Cryptography. CSE P 590E: Practical aspects of modern cryptography, autumn 2016. Retrieved Apr. 26, 2023, from https://courses.cs.washington.edu/courses/csep590e/16au/ (Year: 2016).
Arthur, W., & Challener, D. (2015). A practical guide to Tpm 2.0 using the Trusted Platform Module in the New Age of security. Apress. (Year: 2015).
Definition of root key. PCMAG. (n.d.). Retrieved Apr. 26, 2023, from https://www.pcmag.com/encyclopedia/term/root-key (Year: 2023).
Gimenez, O., & Petrov,, I. (Apr. 2021). RFC 9011: Static context header compression and fragmentation (SCHC . . . Retrieved Apr. 26, 2023, from https://www.rfc-editor.org/rfc/rfc9011.pdf (Year: 2021).
LoRaWAN 1.0.2. (n.d.). (Year: 2023).
Menezes, Oorschot, Vanstone. (1996). Handbook of Applied Cryptography. CRC. (Year: 1996).
Root key definition. Law Insider. (n.d.). Retrieved Apr. 26, 2023, from https://www.lawinsider.com/dictionary/root-key (Year: 2023).
Steven M. Kaplan, Wiley Electrical & Electronics Engineering Dictionary 605 (2004) ("Wiley EE Dictionary") (Year: 2004).

* cited by examiner

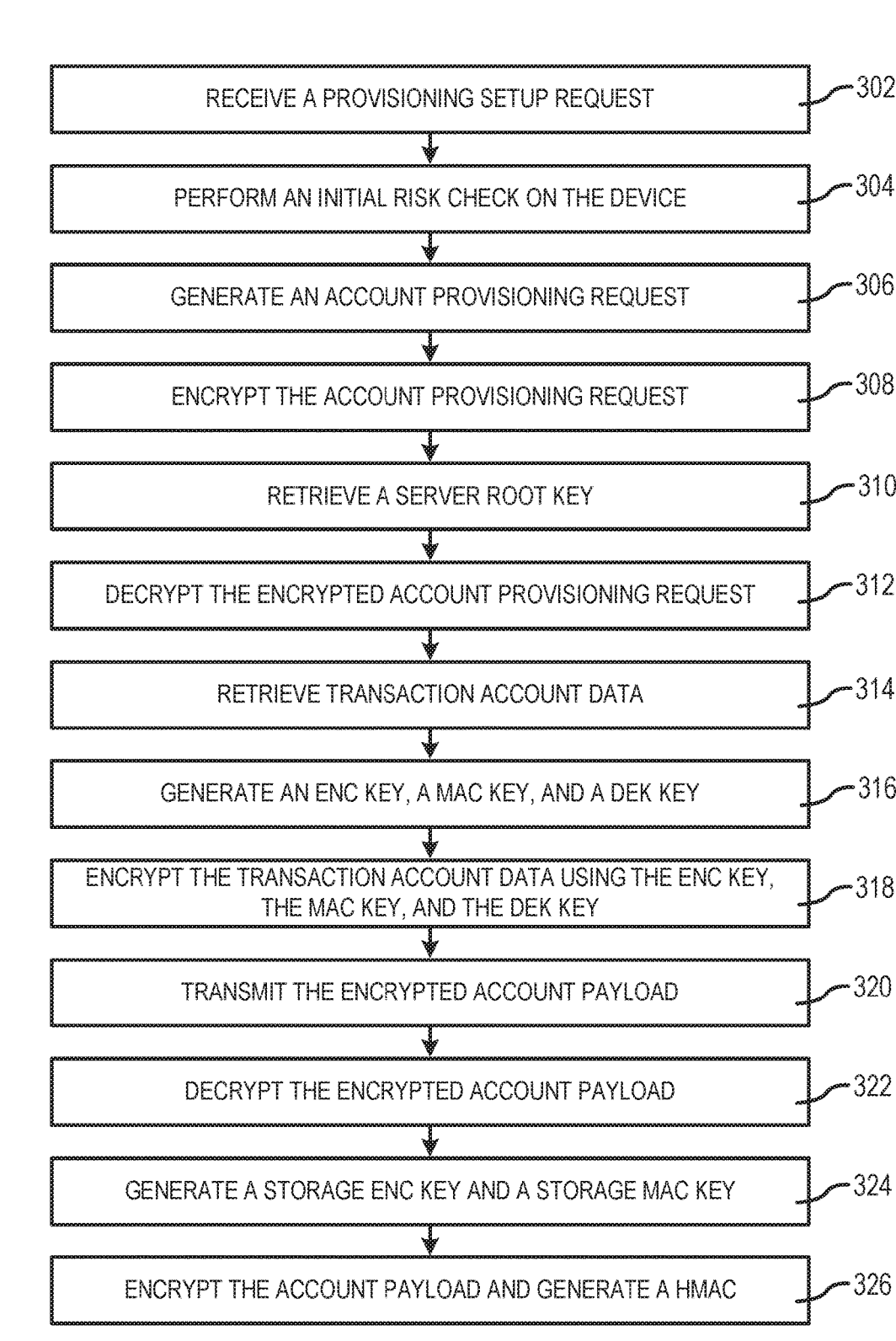

301

| | |
|---|---|
| RECEIVE A PROVISIONING SETUP REQUEST | 302 |
| PERFORM AN INITIAL RISK CHECK ON THE DEVICE | 304 |
| GENERATE AN ACCOUNT PROVISIONING REQUEST | 306 |
| ENCRYPT THE ACCOUNT PROVISIONING REQUEST | 308 |
| RETRIEVE A SERVER ROOT KEY | 310 |
| DECRYPT THE ENCRYPTED ACCOUNT PROVISIONING REQUEST | 312 |
| RETRIEVE TRANSACTION ACCOUNT DATA | 314 |
| GENERATE AN ENC KEY, A MAC KEY, AND A DEK KEY | 316 |
| ENCRYPT THE TRANSACTION ACCOUNT DATA USING THE ENC KEY, THE MAC KEY, AND THE DEK KEY | 318 |
| TRANSMIT THE ENCRYPTED ACCOUNT PAYLOAD | 320 |
| DECRYPT THE ENCRYPTED ACCOUNT PAYLOAD | 322 |
| GENERATE A STORAGE ENC KEY AND A STORAGE MAC KEY | 324 |
| ENCRYPT THE ACCOUNT PAYLOAD AND GENERATE A HMAC | 326 |

FIG. 3

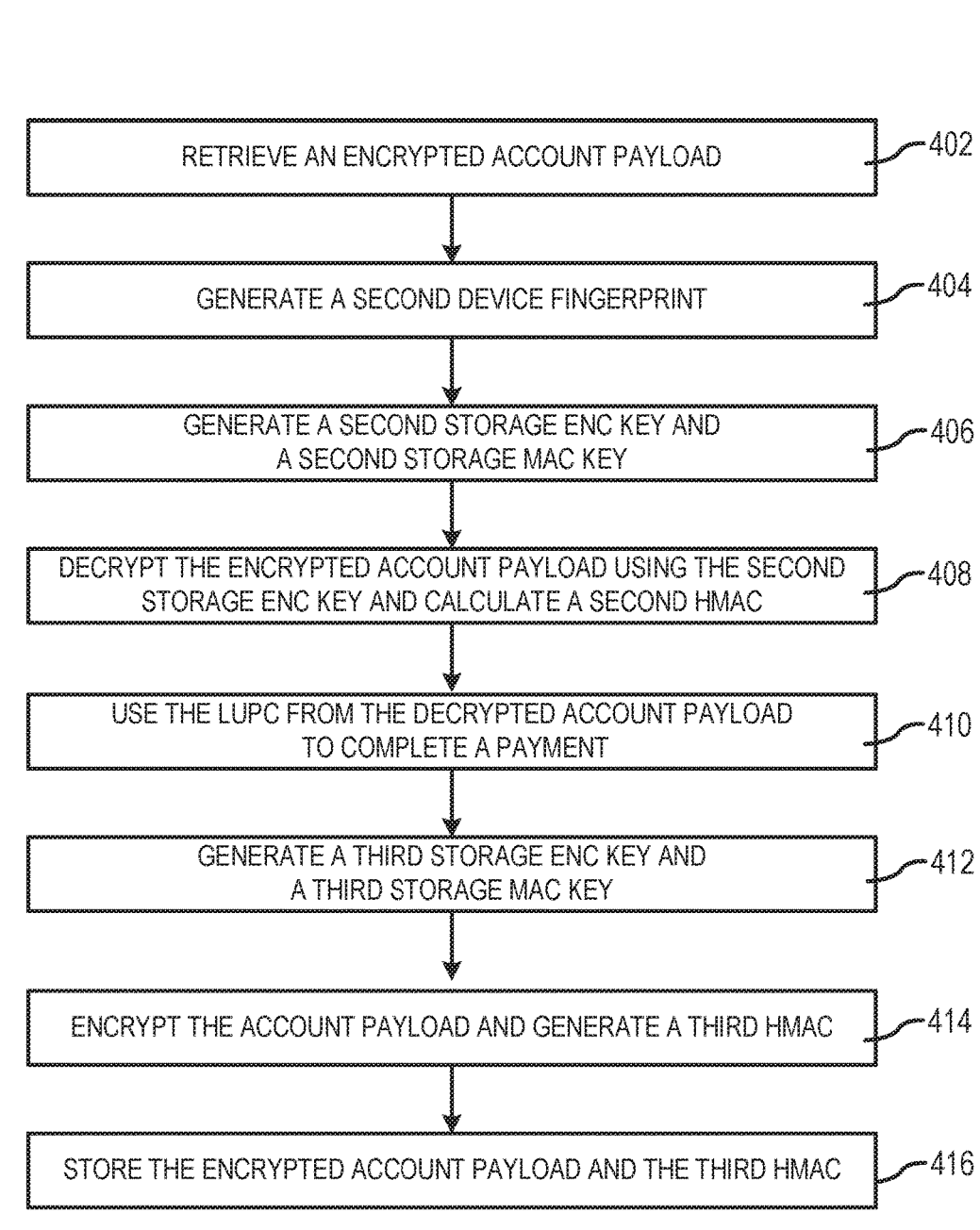

401

RETRIEVE AN ENCRYPTED ACCOUNT PAYLOAD —402

GENERATE A SECOND DEVICE FINGERPRINT —404

GENERATE A SECOND STORAGE ENC KEY AND
A SECOND STORAGE MAC KEY —406

DECRYPT THE ENCRYPTED ACCOUNT PAYLOAD USING THE SECOND
STORAGE ENC KEY AND CALCULATE A SECOND HMAC —408

USE THE LUPC FROM THE DECRYPTED ACCOUNT PAYLOAD
TO COMPLETE A PAYMENT —410

GENERATE A THIRD STORAGE ENC KEY AND
A THIRD STORAGE MAC KEY —412

ENCRYPT THE ACCOUNT PAYLOAD AND GENERATE A THIRD HMAC —414

STORE THE ENCRYPTED ACCOUNT PAYLOAD AND THE THIRD HMAC —416

FIG. 4

SECURED ACCOUNT PROVISIONING AND PAYMENTS FOR NFC-ENABLED DEVICES

CROSS-REFERENCE TO RELATED APPLICATION

This application is a continuation of co-pending U.S. utility application entitled, "Secured Account Provisioning and Payments for NFC-Enabled Devices," having Ser. No. 17/523,085, filed Nov. 10, 2021, which is a continuation of U.S. utility application entitled, "Secured Account Provisioning and Payments for NFC-Enabled Devices," having Ser. No. 15/810,416, filed Nov. 13, 2017 and issued as U.S. Pat. No. 11,182,780, which are all entirely incorporated herein by reference.

TECHNICAL FIELD

The disclosure generally relates to financial transactions, and more specifically, to systems and methods for secured account provisioning and payments using near-field communication (NFC) enabled devices.

BACKGROUND

Credit cards, charge cards, debit cards, and other transaction instruments may be commonly accepted today as a form of payment to a merchant under a variety of circumstances. For example, cell phones, wristwatches, and similar technologies may allow for payments at a point of sale using near-field communication (NFC) technologies. The transaction account may be stored electronically on the NFC-enabled device, and in response to a payment request, electronic data related to the transaction account may be passed to the point of sale to complete the transaction.

SUMMARY

Systems, methods, and articles of manufacture (collectively, the "system") for secured account provisioning and payments using NFC-enabled devices are disclosed. The system may receive an encrypted account provisioning request comprising a provisioning account and a device fingerprint; retrieve a server root key; decrypt the encrypted account provisioning request with the server root key; retrieve a limited use payment credential (LUPC) based on the provisioning account; generate an ENC key, a MAC key, and a DEK key based on the device fingerprint and the server root key; and encrypt the a LUPC using the ENC key, the MAC key, and the DEK key to generate an encrypted account payload.

In various embodiments, the system may also execute an initial risk check, wherein the initial risk check comprises an attestation service configured to execute on a user device prior to generation of the encrypted account provisioning request. In various embodiments, the system may also transmit the encrypted account payload to a user device. In response to receiving the encrypted account payload the user device may be configured to generate a second ENC key, a second MAC key, and a second DEK key based on the device fingerprint and a root key, and decrypt the encrypted account payload using the second ENC key, the second MAC key, and the second DEK key. In response to decrypting the encrypted account payload, the user device may be configured to generate a second device fingerprint, generate a storage ENC key and a storage MAC key based on the second device fingerprint and a storage root key, encrypt the LUPC using the storage ENC key, and generate a keyed-hash message authentication code (HMAC) based on the storage MAC key.

In various embodiments, in response to the user device receiving a payment request, the user device may be configured to generate a third device fingerprint, generate a second storage ENC key and a second storage MAC key based on the third device fingerprint and a storage root key, decrypt the encrypted L UPC using the second storage ENC key, and generate a second HMAC based on the second storage MAC key for comparison against the HMAC. The user device may be configured to transmit the LUPC to complete the payment request. In response to completing the payment request the user device may be configured to generate a third storage ENC key and a third storage MAC key based on the third device fingerprint and the storage root key, encrypt the LUPC using the third storage ENC key, and generate a third HMAC based on the third storage MAC key.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 3 illustrates a process flow for a method of secured account provisioning, in accordance with various embodiments; and FIG. 4 illustrates a process flow for a method of payment using a secured account is disclosed, in accordance with various embodiments.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The system may be configured to provide secured account provisioning and secured payment for near field communication (NFC) enabled devices. The system may allow for the secure transmission and storage of transaction account numbers on an NFC-enabled device. Moreover, the system may allow for the coding of the disclosed security operations and encryptions at the native development key (NDK) level (typically built in C or C++) on ANDROID® based applications instead of the software development kit (SDK) level (typically built in JAVA®). In that regard, the system may improve the computer functioning and computer security in that coding on the NDK level may be at least partially more difficult to reverse engineer and/or decompile compared to coding on the SDK level, allowing the storage and transmission of transaction account numbers to be more secure than typical systems in the prior art (e.g., C languages are compiled into binary machine code that is at least partially more difficult to reverse engineer and/or decompile than JAVA languages that are compiled into JVM byte code).

Figure 1:
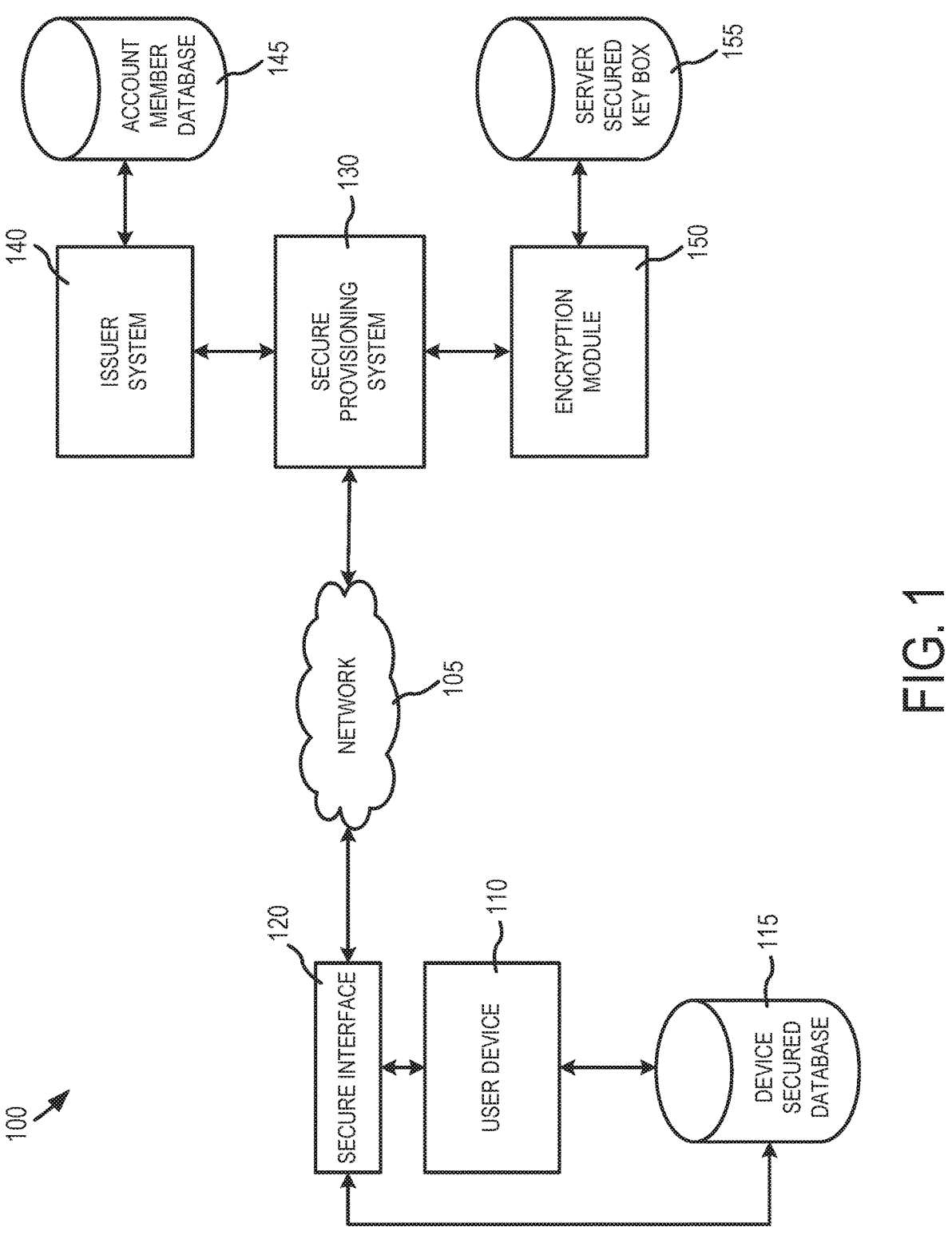
FIG. 1 is a block diagram illustrating various system components of a system for secured account provisioning, in accordance with various embodiments.

The system further improves the functioning of the computer (e.g., user device 110, with brief reference to FIG. 1). For example, by automating the encryption and security of confidential data (including transaction account data) as opposed to needing the user to manually input data (such as security verification codes and the like), the user performs less computer functions and provides less input, which saves on data storage and memory, thus speeding processing in the computer. Moreover, by at least partially reducing the need for user input, battery life on the computer (e.g., smartphone, cell phone, etc.) may be improved, and the speed of transactions using NFC-enabled devices may also be increased. Additionally, by transmitting, storing, and accessing data using the processes described herein, the security of the data is improved, which decreases the risk of the computer or network (e.g., network 105), or the data itself (including confidential data such as transaction account data) from being compromised. For example, encryption keys and data may be stored on a mobile device using White Box Cryptography.

In various embodiments, and with reference to FIG. 1, a system 100 for secured account provisioning is disclosed. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, system 100 may comprise one or more of a user device 110, a network 105, a secure provisioning system 130, an issuer system 140, an encryption module 150, an account member database 145, and/or a hardware security module 155. Account member database 145 and hardware security module 155 may comprise one or more physically separated databases, and/or each database may be logically distinct. The various systems and components described herein may be in direct logical communication with each other via a bus, network, and/or through any other suitable means, or may be individually connected as described further herein.

In various embodiments, user device 110 may comprise any suitable hardware and/or software components capable of sending and receiving data. For example, user device 110 may comprise a personal computer, personal digital assistant, cellular phone, kiosk, and/or the like. User device 110 may also comprise a near-field communication (NFC) enabled device, such as a smartphone (e.g., IPHONE®, BLACKBERRY®, and/or the like), a smart-ring, a wristwatch, and/or the like. User device 110 may be in operative and/or electronic communication with a secure interface 120. Secure interface 120 may comprise a website, application, and/or the like. For example, secure interface 120 may comprise an application or micro-app configured to leverage the resources of the larger operating system and associated hardware on user device 110, via a set of predetermined rules which govern the operations of various operating systems and hardware resources, as discussed further herein. Secure interface 120 may be configured to allow a transaction account owner, via user device 110, access to secure provisioning system 130. In that respect, secure interface 120 may require a secure login in order to grant the transaction account owner access to secure provisioning system 130. For example, the transaction account owner may access secure provisioning system 130, via secure interface 120, by entering secure login information (e.g., a user name and password, transaction account number, a biometric input (e.g., a fingerprint), etc.).

In various embodiments, the transaction account owner may access secure provisioning system 130, via secure interface 120, to provision a transaction account. In that respect, provisioning may refer to the process of securely storing transaction account information on user device 110 such that the transaction account may be used for NFC-enabled payments. For example, the transaction account owner may electronically access secure provisioning system 130, via secure interface 120, to select one or more transaction accounts to be added to the user device 110 for NFC-enabled payments. As discussed further herein, in response to the transaction account owner transmitting a provisioning setup request, secure interface 120 may begin operations to provision a transaction account. For example, secure interface 120 may command secure provisioning system 130 to perform an initial risk check on user device 110, as discussed further herein. For example, during the initial risk check, secure provisioning system 130 may examine software and hardware information on user device 110 to assess integrity of user device 110 (e.g., using an attestation service or the like). The initial risk check may determine whether user device 110 has been tampered with or rooted, whether previous provisioning requests from user device 110 were denied, the frequency of provisioning requests transmitted from user device 110, and/or similar assessments. Based on the initial risk check, secure provisioning system 130 may determine whether to proceed with account provisioning. For example, secure provisioning system 130 may invoke an attestation service, API, or the like that may perform the initial risk check on user device 110 and return data indicating whether user device 110 is in a non-tampered state (e.g., whether user device 110 passes the initial risk check). In response to user device 110 passing the initial risk check, user device 110 may be configured to prompt the user to select one or more transaction accounts for provisioning.

In response to the transaction account owner selecting one or more transaction accounts for provisioning, user device 110, via secure interface 120, may be configured to generate an account provisioning request. The account provisioning request may comprise a provisioning account and a device fingerprint. The provisioning account may comprise data indicating the one or more transaction accounts selected by the transaction account owner. The device fingerprint may be generated by secure interface 120, and may comprise data indicating a unique identifier or profile of user device 110. For example, the device fingerprint may comprise a hash numerical value of various user device 110 attributes, such as a media access control (MAC) address, attributes related to the operating system (e.g., an ANDROID® ID, an APPLE® ID, etc.), an application build ID, a build serial number, a subscriber identification module (SIM) card identifier (e.g., an international mobile equipment identity (IMEI) number, an international mobile subscriber identity (IMSI) number, a mobile equipment identifier (MEI) number, electronic serial number (ESN), etc.), or the like.

The account provisioning request may be encrypted by secure interface 120. For example, the account provisioning request may be encrypted using a field level encryption key. In that regard, secure interface 120 may be in electronic and/or operative communication with device secured database 115. Device secured database 115 may be located on user device 110. Device secured database 115 may be configured to securely store encrypted account payloads, as discussed further herein. Device secured database 115 may also be configured to store one or more field level encryption keys. The field level encryption keys may comprise public encryption keys. For example, and as discussed further herein, the field level encryption keys may match a server root key stored by secure provisioning system 130 such that secure interface 120 may encrypt data with the field level encryption keys that may be decrypted by secure provisioning system 130 using the server root key. Secure interface 120 may retrieve the field level encryption key from device secured database 115, and may encrypt the encrypted account provisioning request using the field level encryption keys. Secure interface 120 may transmit the encrypted account provisioning request to secure provisioning system 130.

In various embodiments, user device 110, via secure interface 120, and secure provisioning system 130 may be interconnected via network 105. As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, secure provisioning system 130 may be configured as a central hub for access to various components, databases, and modules of system 100. Secure provisioning system 130 may comprise a sub-network, computer-based system, software component, and/or the like configured to provide an access point to various systems, engines, and components. Secure provisioning system 130 may be in electronic and/or operative communication with issuer system 140 and encryption module 150. Secure provisioning system 130 may be configured to perform various operations for secured account provisioning and secured account payments using NFC-enabled devices.

In various embodiments, encryption module 150 may be configured to decrypt the encrypted account provisioning request. Encryption module 150 may comprise hardware, software, or the like configured to encrypt and decrypt data payloads, and transmit data to various sources, as discussed further herein. Encryption module 150 may be in electronic and/or operative communication with secure provisioning system 130 and hardware security module 155. Secure provisioning system 130 may transmit the encrypted account provisioning request to encryption module 150. In response to receiving the encrypted account provisioning request, encryption module 150 may be configured to retrieve a server root key from hardware security module 155. The server root key may comprise any suitable type of encryption key, such as, for example, RSA 2048. Hardware security module 155 may be configured to store and maintain one or more server root keys. Hardware security module 155 may comprise any suitable type of database, and may store the data using any suitable technique described herein or known in the art. The server root key may comprise a public encryption key. In that respect, the server root key may be similar to the field level encryption key. For example, matching server root keys and field level encryption keys may allow system 100 to encrypt and decrypt data over network 105. Encryption module 150 may be configured to decrypt the encrypted account provisioning request to determine the provisioning account and the device fingerprint. In that respect, encryption module 150 may decrypt the encrypted account provisioning request using the server root key to determine the provisioning account and the device fingerprint contained therein. Encryption module 150 may transmit data comprising the provisioning account to secure provisioning system 130.

In response to receiving the provisioning account from encryption module 150, secure provisioning system 130 may be configured to retrieve transaction account data based on the provisioning account. Secure provisioning system 130 may query issuer system 140 to retrieve the transaction account data. Issuer system 140 may be configured as a central hub to access various systems, engines, and components of a payment network, as discussed further herein. Issuer system 140 may be in electronic and/or operative communication with secure provisioning system 130 and account member database 145. Account member database 145 may comprise any suitable type of database and may be configured store and maintain transaction account data regarding transaction accounts, such as, for example, a transaction account number, user account access data (e.g., username, password, and/or the like), transaction account identifying information (e.g., owner address, city, state, zip code, etc.), a card security code (CSC) or a card verification value (CVV), transaction account balance, and/or other such similar data. Account member database 145 may store the data using any suitable technique described herein or known in the art. In response to being queried by secure provisioning system 130, issuer system 140 may query account member database 145 to retrieve the transaction account data matching the provisioning account. The transaction account data may comprise data corresponding to the transaction account, such as, for example, a transaction account number, account identifying information, or the like. In various embodiments, issuer system 140 may also be configured to generate the transaction account data as a limited use payment credential (LUPC). Secure provisioning system 130 may transmit the transaction account data to encryption module 150. Issuer system 140 may further calculate a cryptogram using the LUPC, and transmit the cryptogram to encryption module 150.

In response to receiving the transaction account data, encryption module 150 may be configured to generate an ENC key, a MAC key, and a DEK key. Encryption module 150 may generate the ENC key, the MAC key, and the DEK key based on the device fingerprint and a root key (e.g., an AES 128 root key, the server root key, etc.). For example the ENC key, the MAC key, and the DEK key may be generated to comprise distinct numerical values based on the numerical value contained within the device fingerprint. In that respect, device fingerprints having different numerical values may be used to generate ENC keys, the MAC keys, and DEK keys having different values. The ENC key (e.g., an encryption key) may be used to encrypt the account payload, as discussed further herein. The MAC key (e.g., a message authentication code key) may be used to digitally sign the encrypted account payload, as discussed further herein. The DEK key (e.g., a data encryption key) may be used to encrypt the transaction account data (e.g., a limited use payment credential (LUPC), or the like), prior to generating the account payload, as discussed further herein. In response to generating the keys, encryption module 150 may be configured to encrypt the transaction account data. Encryption module 150 may use the DEK key to encrypt the limited use payment credential (LUPC) in the transaction account data. Encryption module 150 may use the ENC key to encrypt the transaction account data. Encryption module 150 may use the MAC key to digitally sign the transaction account data. In that respect, an encrypted account payload may be generated, wherein the encrypted account payload comprises the encrypted transaction account data that has been digitally signed. In response to encrypting the transaction account data, encryption module 150 may transmit the encrypted account payload to secure provisioning system 130. Secure provisioning system 130 may transmit the encrypted account payload, via network 105, to secure interface 120.

In response to receiving the encrypted account payload, secure interface 120 may be configured to decrypt the account payload. Secure interface 120 may generate the ENC key, the MAC key, and the DEC key to decrypt the account payload. Secure interface 120 may be configured to generate the storage ENC key and the storage MAC key based on the device fingerprint and a storage root key (e.g., an AES 128 root key), similar to the generation of MAC keys and ENC keys. Secure interface 120 may encrypt the account payload using the storage ENC key. Secure interface 120 may use the storage MAC key to generate the HMAC based on the encrypted account payload. Secure interface 120 may be configured to store the encrypted account payload and the HMAC in device secured database 115. The encrypted account payload and the HMAC may be stored using any suitable technique.

Figure 2:
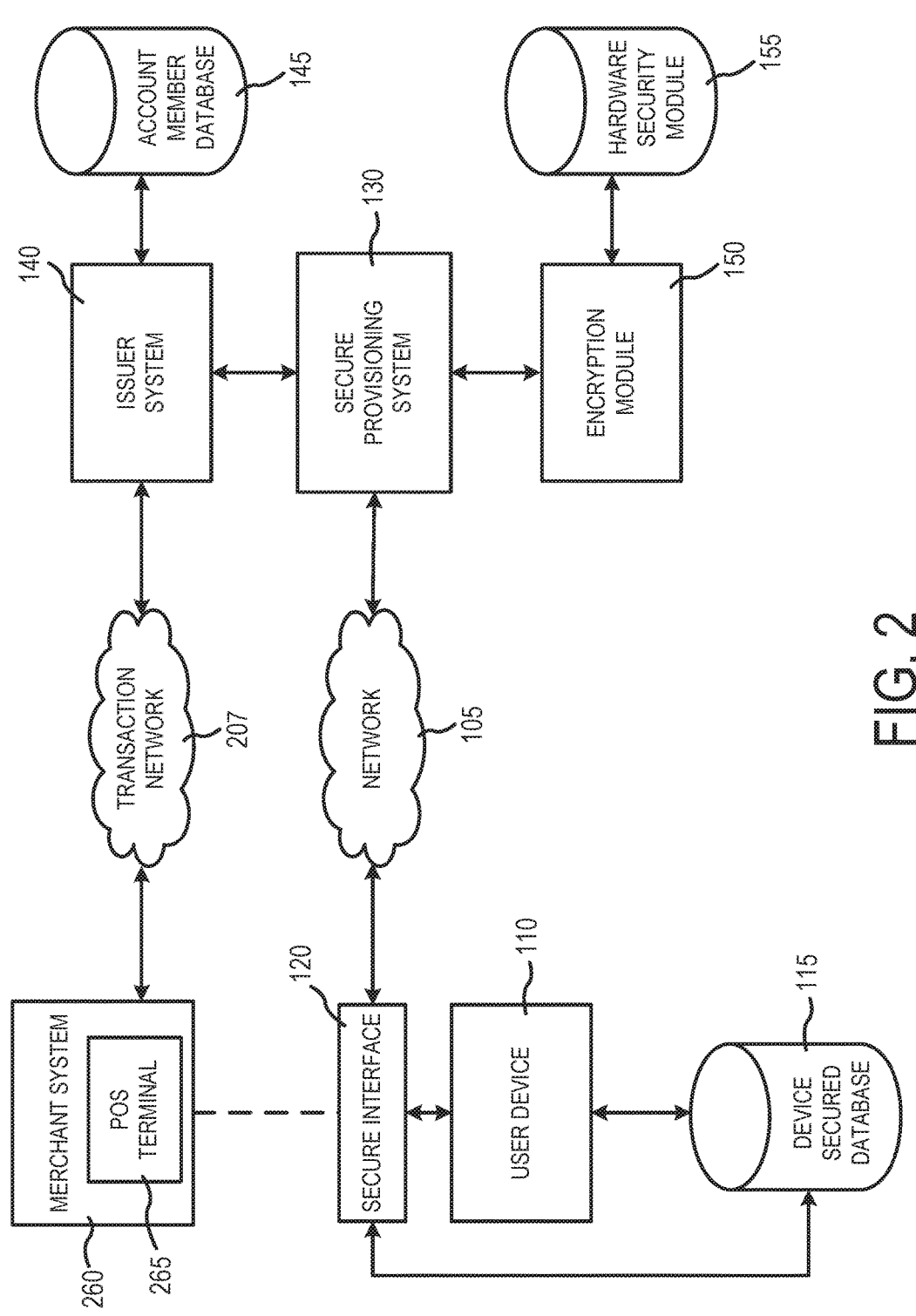
FIG. 2 is a block diagram illustrating various system components of a system for secured account payments using NFC-enabled devices, in accordance with various embodiments.

In various embodiments, and with reference to FIG. 2, a system 200 for secured account payments using NFC-enabled devices is disclosed. System 200 may enable a user device 110, via secure interface 120, to interact with a merchant system to make a secured payment. In various embodiments, merchant system 260 may be configured to initiate and conduct transactions with transaction account owners, beneficiaries, or the like. Merchant system 260 may comprise a POS terminal 265 configured as a mechanism to conduct a transaction. For example, POS terminal 265 may comprise a cashier station, a credit and/or debit card reader, an EMV card reader, and/or the like. POS terminal 265 may also comprise a near-field communication (NFC) terminal. An NFC terminal may allow for the transfer of information (e.g., payment information, payment tokens, etc.) from a NFC enabling user device (e.g., user device 110), such as, for example, a mobile device, watch, and/or the like. In response to a user initiating the transaction with merchant system 260, via POS terminal 265, merchant system 260 may generate a transaction authorization request. The transaction authorization request may comprise any suitable data related to the transaction, such as a payment amount, a merchant ID, the transaction account number, or the like. Merchant system 260 may in electronic and/or operative communication with issuer system 140. Merchant system 260 may be configured to transmit the transaction authorization request to issuer system 140. Issuer system 140 may be configured to complete the payment transaction as a standard transaction typical of those known in the art.

In various embodiments, merchant system 260 and issuer system 140 may be interconnected via a transaction network 207. Transaction network 207, which may be part of certain transactions, represents existing proprietary networks that presently accommodate transactions for credit cards, debit cards, and/or other types of transactional instruments. Transaction network 207 may be a closed network that is secure from eavesdroppers. In various embodiments, transaction network 207 may comprise an exemplary transaction network such as American Express®, VisaNet®, Mastercard®, Discover®, Interac®, Cartes Bancaires, JCB®, private networks (e.g., department store networks), and/or any other payment network.

In response to the transaction account holder initiating a payment with merchant system 260, secure interface 120 may be configured to retrieve the encrypted account payload. Secure interface 120 may be configured to generate a second device fingerprint. The second device fingerprint may comprise data indicating a unique identifier or profile of user device 110 at the time of the initiated NFC-enabled payment. For example, the second device fingerprint may comprise a hash numerical value of various user device 110 attributes, such as a media access control (MAC) address, attributes related to the operating system (e.g., an ANDROID® ID, an APPLE® ID, etc.), an application build ID, a build serial number, a subscriber identification module (SIM) card identifier (e.g., an international mobile equipment identity (IMEI) number, an international mobile subscriber identity (IMSI) number, a mobile equipment identifier (MEI) number, electronic serial number (ESN), etc.), or the like. In that respect, the second device fingerprint may be different than the (first) device fingerprint in response to a change in the hardware, software, or the like on user device 110. The second device fingerprint may also be the same as the (first) device fingerprint in response to no changes occurring in the hardware, software, or the like on user device 110.

In response to generating the second device fingerprint, secure interface 120 may be configured to generate a second storage ENC key and a second storage MAC key, based on the second device fingerprint. Secure interface 120 may generate the second storage ENC key and the second storage MAC key similar to generating the (first) storage ENC key and the (first) storage MAC key. For example, secure interface 120 may be configured to generate the second storage ENC key and the second storage MAC key based on the second device fingerprint and the storage root key (e.g., an AES 128 root key). In that regard, in response to a change in user device 110 causing the second device fingerprint to be different than the (first) device fingerprint, the second storage ENC key and the second storage MAC key may be different than the (first) storage ENC key and the (first) storage MAC key previously generated. In response to second device fingerprint matching the (first) device fingerprint, the second storage ENC key and the second storage MAC key may be the same as the (first) storage ENC key and the (first) storage MAC key previously generated.

Secure interface 120 may be configured to decrypt the encrypted account payload. Secure interface 120 may decrypt the encrypted account payload using the second storage ENC key. In response to the second storage ENC key not matching the (first) storage ENC key, secure interface 120 may be unable to decrypt the encrypted account payload. Secure interface 120 may calculate the second HMAC based on the decrypted account payload and the second storage MAC key. The second HMAC may be compared to the (first) stored HMAC to determine accuracy. For example, in response to the second storage MAC key not matching the (first) storage MAC key, the second HMAC may be different than the (first) stored HMAC. In response to decrypting the encrypted account payload, secure interface 120 may transmit the LUPC to merchant system 260, via POS terminal 265. Merchant system 260 may finalize the purchase, as discussed further herein. In response to the transaction completing successfully, secure interface 120 may be configured to re-encrypt the account payload. Secure interface 120 may generate a third storage ENC key and a third storage MAC key similar to generating the second storage ENC key and the second storage MAC key. For example, secure interface 120 may be configured to generate the third storage ENC key and the third storage MAC key based on the second device fingerprint and the storage root key (e.g., an AES 128 root key). In various embodiments, secure interface 120 may also be configured to generate the third storage ENC key and the third storage MAC key based on the second device fingerprint, the storage root key, and a random key such that the newly generated storage MAC key and storage ENC key are different after each payment. Secure interface 120 may encrypt the account payload and generate the third HMAC similar to encrypting the account payload and generating the (first) HMAC. Secure interface 120 may encrypt the account payload using the third storage ENC key. Secure interface 120 may use the storage MAC key to generate the third HMAC based on the encrypted account payload.

In various embodiments, secure interface 120 may be configured to store the encrypted account payload and the third HMAC in device secured database 115. Secure interface 120 may transmit the encrypted account payload to device secured database 115 for storage. Secure interface 120 may also transmit the third HMAC to device secured database 115 for storage.

Referring now to FIGS. 3 and 4, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIGS. 3 and 4, but also to the various system components as described above with reference to FIGS. 1 and 2.

In various embodiments, and with specific reference to FIG. 3, a method 301 for secured account provisioning is disclosed. Method 301 may comprise receiving a provisioning setup request (step 302). Secure provisioning system 130 may be configured to receive the provisioning setup request. For example, secure provisioning system 130 may receive the provisioning setup request from user device 110, via secure interface 120 and network 105. User device 110, via secure interface 120, may be configured to generate and transmit the provisioning setup request in response to user input requesting to provision an account for use on user device 110. The provisioning setup request may comprise data indicating the user device 110 to provision the account on.

In various embodiments, method 301 may comprise performing an initial risk check on the device (step 304). Secure provisioning system 130 may be configured to perform the initial risk check on user device 110 in response to receiving the provisioning setup request. During the initial risk check, secure provisioning system 130 may examine software and hardware information on user device 110 to assess integrity of user device 110 (e.g., using an attestation service or the like). The initial risk check may determine whether user device 110 has been tampered with or rooted, whether previous provisioning requests from user device 110 were denied, the frequency of provisioning requests transmitted from user device 110, and/or similar assessments. Based on the initial risk check, secure provisioning system 130 may determine whether to proceed with account provisioning. For example, secure provisioning system 130 may invoke an attestation service, API, or the like that may perform the initial risk check on user device 110 and return data indicating whether user device 110 is in a non-tampered state (e.g., whether user device 110 passes the initial risk check).

In various embodiments, method 301 may comprise generating an account provisioning request (step 306). User device 110, via secure interface 120, may be configured to generate the account provisioning request. The account provisioning request may comprise a provisioning account and a device fingerprint. The provisioning account may comprise data indicating the transaction account that a transaction account owner desires to have provisioned for use on user device 110 (e.g., made available for NFC-enabled payments). The device fingerprint may be generated by secure interface 120, and may comprise data indicating a unique identifier or profile of user device 110. For example, the device fingerprint may comprise a hash numerical value of various user device 110 attributes, such as a media access control (MAC) address, attributes related to the operating system (e.g., an ANDROID® ID, an APPLE® ID, etc.), an application build ID, a build serial number, a subscriber identification module (SIM) card identifier (e.g., an international mobile equipment identity (IMEI) number, an international mobile subscriber identity (IMSI) number, a mobile equipment identifier (MEI) number, electronic serial number (ESN), etc.), or the like. In various embodiments, method 301 may comprise encrypting the account provisioning request (step 308). Secure interface 120 may be configured to encrypt the account provisioning request. For example, the account provisioning request may be encrypted using a field level encryption key. Secure interface 120 may retrieve the field level encryption key from device secured database 115, and may encrypt the account provisioning request using the field level encryption key. User device 110, via secure interface 120, may transmit the encrypted account provisioning request to secure provisioning system 130, via network 105.

In various embodiments, method 301 may comprise retrieving a server root key (step 310). Encryption module 150 may retrieve the server root key from hardware security module 155. The server root key may comprise a public encryption key. In that respect, the server root key may be the public encryption key corresponding to the field level encryption key. Method 301 may comprise decrypting the encrypted account provisioning request (step 312). Encryption module 150 may be configured to decrypt the encrypted account provisioning request using the server root key to determine the provisioning account and the device fingerprint. Encryption module 150 may transmit data comprising the provisioning account to secure provisioning system 130. Method 301 may comprise retrieving transaction account data (step 314). Secure provisioning system 130 may query account member database 145, via issuer system 140, to retrieve the transaction account data. In that regard, secure provisioning system 130 may retrieve the transaction account data based on the provisioning account (e.g., secure provisioning system 130 may retrieve the transaction account data corresponding to the transaction account number specified in the provisioning account). The transaction account data may comprise data corresponding to the transaction account, such as, for example, a limited use payment credential (LUPC), an account number, account identifying information, or the like. Secure provisioning system 130 may transmit the transaction account data to encryption module 150.

In various embodiments, method 301 may comprise generating an ENC key, a MAC key, and a DEK key (step 316). Encryption module 150 may be configured to generate the ENC key, the MAC key, and the DEK key. Encryption module 150 may generate the ENC key, the MAC key, and the DEK key based on the device fingerprint and a root key (e.g., an AES 128 root key). The ENC key (e.g., an encryption key) may be used to encrypt the account payload, as discussed further herein. The MAC key (e.g., a message authentication code key) may be used to digitally sign the encrypted account payload, as discussed further herein. The DEK key (e.g., a data encryption key) may be used to encrypt the transaction account data (e.g., the LUPC), prior to generating the account payload, as discussed further herein.

In various embodiments, method 301 may comprise encrypting the transaction account data with the ENC key, the MAC key, and the DEK key (step 318). Encryption module 150 may be configured to encrypt the transaction account data (e.g., the LUPC). Encryption module 150 may use the DEK key to encrypt the LUPC in the transaction account data. Encryption module 150 may use the ENC key to encrypt the account payload. Encryption module 150 may use the MAC key to digitally sign the transaction account data (e.g., the account payload). In that respect, an encrypted account payload may be generated, wherein the encrypted account payload comprises the encrypted transaction account data (e.g., the LUPC) that has been digitally signed.

In various embodiments, method 301 may comprise transmitting the encrypted account payload (step 320). Encryption module 150 may transmit the encrypted account payload to secure provisioning system 130. Secure provisioning system 130 may transmit the encrypted account payload, via network 105, to secure interface 120. Method 301 may comprise decrypting the encrypted account payload (step 322). Secure interface 120 may be configured to decrypt the encrypted account payload by generating the (second) ENC key, the (second) MAC key, and the (second) DEK key based on the device fingerprint and the root key, similar to step 316. Secure interface 120 may be configured to decrypt the encrypted account payload. For example, secure interface 120 may use MAC key to verify the digital signature of the encrypted account payload. Secure interface 120 may use the ENC key to decrypt the encrypted account payload. Secure interface 120 may use the DEK key to decrypt the LUPC in the encrypted account payload.

Method 301 may comprise generating a storage ENC key and a storage MAC key (step 324). Secure interface 120 may be configured to generate the storage ENC key and the storage MAC key based on the device fingerprint and a storage root key (e.g., an AES 128 root key), similar to the generation of MAC keys and ENC keys in step 316. Method 301 may comprise encrypting the account payload and generating a keyed-hash message authentication code (HMAC) (step 326). Secure interface 120 may encrypt the account payload using the storage ENC key. Secure interface 120 may use the storage MAC key to generate the HMAC based on the encrypted account payload. Secure interface 120 may be configured to store the encrypted account payload and the HMAC in device secured database 115.

In various embodiments, and with specific reference to FIG. 4, a method 401 for payment using a secured account is disclosed. Method 401 may comprise retrieving an encrypted account payload (step 402). For example, secure interface 120 may retrieve the encrypted account payload in response to user device 110 initiating a NFC-enabled payment with merchant system 260, via POS terminal 265. For example, secure interface 120 may receive a payment request from merchant system 260.

In various embodiments, method 401 may comprise generating a second device fingerprint (step 404). The second device fingerprint may be generated by secure interface 120, and may comprise data indicating a unique identifier or profile of user device 110 at the time of the initiated NFC-enabled payment. For example, the second device fingerprint may comprise a hash numerical value of various user device 110 attributes, such as a media access control (MAC) address, attributes related to the operating system (e.g., an ANDROID® ID, an APPLE® ID, etc.), an application build ID, a build serial number, a subscriber identification module (SIM) card identifier (e.g., an international mobile equipment identity (IMEI) number, an international mobile subscriber identity (IMSI) number, a mobile equipment identifier (MEI) number, electronic serial number (ESN), etc.), or the like. In that respect, the second device fingerprint may be different than the (first) device fingerprint in response to a change in the hardware, software, or the like occurring on user device 110. The second device fingerprint may also be the same as the (first) device fingerprint in response to no changes occurring in the hardware, software, or the like on user device 110.

In various embodiments, method 401 may comprise generating a second storage ENC key and a second storage MAC key (step 406). Secure interface 120 may generate the second storage ENC key and the second storage MAC key similar to generating the (first) storage ENC key and the (first) storage MAC key in step 324, with brief reference to FIG. 3. For example, secure interface 120 may be configured to generate the second storage ENC key and the second storage MAC key based on the second device fingerprint and the storage root key (e.g., an AES 128 root key). In that regard, in response to a change in user device 110 causing the second device fingerprint to be different than the (first) device fingerprint, the second storage ENC key and the second storage MAC key may be different than the (first) storage ENC key and the (first) storage MAC key generated in step 324 of method 301, with brief reference to FIG. 3. In response to second device fingerprint matching the (first) device fingerprint, the second storage ENC key and the second storage MAC key may be the same as the (first) storage ENC key and the (first) storage MAC key generated in step 324 of method 301, with brief reference to FIG. 3.

In various embodiments, method 401 may comprise decrypting the encrypted account payload using the second storage ENC key and calculating a second HMAC (step 408). Secure interface 120 may decrypt the encrypted account payload using the second storage ENC key. In response to the second storage ENC key not matching the (first) storage ENC key, secure interface 120 may be unable to decrypt the encrypted account payload. Secure interface 120 may calculate the second HMAC based on the decrypted account payload and the second storage MAC key. The second HMAC may be compared to the (first) stored HMAC to determine accuracy. For example, in response to the second storage MAC key not matching the (first) storage MAC key, the second HMAC may be different than the (first) stored HMAC. In response to decrypting the encrypted account payload, secure interface 120 may transmit the LUPC to merchant system 260, via POS terminal 265. In that respect, method 401 may comprise using the LUPC from the decrypted account payload to complete the NFC-enabled payment (step 410). Merchant system 260 may transmit a transaction authorization request to issuer system 140 to begin completion of the transaction, as discussed further herein.

In response to the transaction completing successfully, secure interface 120 may be configured to re-encrypt the account payload for storage. Method 401 may comprise generating a third storage ENC key and a third storage MAC key (step 412). Secure interface 120 may generate the third storage ENC key and the third storage MAC key similar to generating the second storage ENC key and the second storage MAC key in step 406. For example, secure interface

120 may be configured to generate the third storage ENC key and the third storage MAC key based on the second device fingerprint and the storage root key (e.g., an AES 128 root key). In various embodiments, secure interface 120 may also be configured to generate the third storage ENC key and the third storage MAC key based on the second device fingerprint, the storage root key, and a random key such that the newly generated storage MAC key and storage ENC key are different after each payment. Method 401 may comprise encrypting the account payload and generating a third HMAC (step 414). Secure interface 120 may encrypt the account payload and generate the third HMAC similar to encrypting the account payload and generating the (first) HMAC in step 326, with brief reference to FIG. 3. Secure interface 120 may encrypt the account payload using the third storage ENC key. Secure interface 120 may use the storage MAC key to generate the third HMAC based on the encrypted account payload. Secure interface 120 may be configured to store the encrypted account payload and the third HMAC in device secured database 115. Method 401 may comprise storing the encrypted account payload (step 416). Secure interface 120 may transmit the encrypted account payload to device secured database 115 for storage. Secure interface 120 may also transmit the third HMAC to device secured database 115 for storage.

The disclosure and claims do not describe only a particular outcome of secured account provisioning and payments for NFC-enabled devices, but the disclosure and claims include specific rules for implementing the outcome of secured account provisioning and payments for NFC-enabled devices and that render information into a specific format that is then used and applied to create the desired results of secured account provisioning and payments for NFC-enabled devices, as set forth in *McRO, Inc. v. Bandai Namco Games America Inc.* (Fed. Cir. case number 15-1080, Sep. 13, 2016). In other words, the outcome of secured account provisioning and payments for NFC-enabled devices can be performed by many different types of rules and combinations of rules, and this disclosure includes various embodiments with specific rules. While the absence of complete preemption may not guarantee that a claim is eligible, the disclosure does not sufficiently preempt the field of warranty enriched transactions at all. The disclosure acts to narrow, confine, and otherwise tie down the disclosure so as not to cover the general abstract idea of just secured account provisioning and payments for NFC-enabled devices. Significantly, other systems and methods exist for secured account provisioning and payments for NFC-enabled devices, so it would be inappropriate to assert that the claimed invention preempts the field or monopolizes the basic tools of secured account provisioning and payments for NFC-enabled devices. In other words, the disclosure will not prevent others from secured account provisioning and payments for NFC-enabled devices, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include alerting a subscriber when their computer is offline. With brief reference to FIG. 1, system 100 may include generating customized information, via secure interface 120, and alerting a remote subscriber that the information can be accessed from their computer (e.g., via user device 110). The alerts are generated by filtering received information, building information alerts and formatting the alerts into data blocks based upon subscriber preference information. The data blocks are transmitted to the subscriber's wireless device (e.g., user device 110), which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface (e.g., via user device 110) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user device 110) from being compromised, for example by being infected with a computer virus. The system may scan, via secure interface 120 for example, electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, system 100 may also address the problem of retaining control over customers during affiliate purchase transactions, using a system for co-marketing the "look and feel" of the host web page with the product-related content information of the advertising merchant's web page (e.g., via merchant system 260, with brief reference to FIG. 2). System 100 can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link, via user device 110, for example, is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "payment vehicle," "financial transaction instrument," "transaction instrument" or "transaction card" may be used interchangeably throughout to refer to a financial instrument. As used herein, an account code may or may not be associated with a physical financial instrument.

Phrases similar to a "processor" (e.g., payment processor) or "transaction account issuer" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various consumer transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

As used herein, "transmit" may include sending electronic data from one system component to another over a network connection. Additionally, as used herein, "data" may include encompassing information such as commands, queries, files, data for storage, and the like in digital or any other form.

Phrases and terms similar to "transaction account" may include any account that may be used to facilitate a financial transaction. For example, a transaction account as used herein may refer to an account associated with an open account or a closed account system (as described herein). The transaction account may exist in a physical or non-physical embodiment. For example, a transaction account may be distributed in non-physical embodiments such as an account number, frequent-flyer account, telephone calling account, and/or the like. Furthermore, a physical embodiment of a transaction account may be distributed as a financial instrument, such as, for example, a credit card, debit card, and/or the like.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA® system developed by AMAZON®. ALEXA® is a cloud-based voice service that can help with tasks, entertainment, general information and more. All AMAZON® ALEXA® devices, such as the AMAZON® Echo, AMAZON® Dot, AMAZON® Tap, AMAZON® Fire TV, have access to the ALEXA® Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audio-books, and providing weather, traffic, and other real time information, such as news. The system may allow the user, via user device 110, to access information about eligible accounts linked to an online account across all ALEXA®-enabled devices.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code", "consumer transaction account", "consumer transaction account number", or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The account number may be distributed and stored in any form of plastic, electronic, magnetic, radio frequency, wireless, audio and/or optical device capable of transmitting or downloading data from itself to a second device. A consumer transaction account number may be, for example, a sixteen-digit account number, although each credit provider has its own numbering system, such as the fifteen-digit numbering system used by AMERICAN EXPRESS®. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant bank account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.3 available at http://www.emvco.com/default.aspx.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge ("ROC"), from summaries of charges ("SOC"), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook® message, Twitter® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale ("POS") devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security ("TLS"). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a time-stamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, and U.S. application Ser. No. 15/785,870 titled API REQUEST AND RESPONSE BALANCING AND CONTROL ON BLOCK-CHAIN and filed on Oct. 17, 2017, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server ("MTS"), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object ("ADO") compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages ("ASP"), common gateway interface scripts ("CGI"), extensible markup language ("XML"), dynamic HTML, cascading style sheets ("CSS"), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, NY) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation ("JSON"), VBScript, Macromedia Cold Fusion, COBOL, MICROSOFT® Active Server Pages, assembly, PERL, PHP, awk, Python, Ruby, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, Google-Pay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a user computing device, a payment request from a point of sale terminal;
obtaining, by the user computing device and from a secure database of the user computing device, a storage encryption (ENC) key based on at least a device fingerprint of the user computing device, a keyed-hash message authentication code previously generated via a storage message authentication code (MAC) key comprising a numerical value based at least in part on the device fingerprint, and a storage root key;
obtaining, by the user computing device, an encrypted account payload from the secure database of the user computing device;
generating, by the user computing device, a second device fingerprint of the user computing device;
generating, by the user computing device, a second storage ENC key and a second storage MAC key based on the second device fingerprint and the storage root key;
matching, by the user computing device, the second storage ENC key to the storage ENC key;
decrypting, by the user computing device, the encrypted account payload using the second storage ENC key based on the matching, wherein the decrypted account payload includes a payment credential;
generating, by the user computing device, a second keyed-hash message authentication code based on the decrypted account payload and the second storage MAC key;
verifying the keyed-hash message authentication code by matching the keyed-hash message authentication code to the second keyed-hash message authentication code; and transmitting, by the user computing device, the payment credential to the point of sale terminal based on the verifying.

2. The method of claim 1, further comprising:
obtaining, by the user computing device, the storage MAC key from the secure database; and
validating, by the user computing device, the decrypted account payload by matching the second storage MAC key to the storage MAC key.

3. The method of claim 2, wherein the decrypted account payload is validated before the payment credential is transmitted to the point of sale terminal.

4. The method of claim 2, wherein the storage MAC key comprises the numerical value based on the numerical value contained within the device fingerprint.

5. The method of claim 1, further comprising:
re-encrypting, by the user computing device, the decrypted account payload for storage in the secure database of the user computing device after transmitting the payment credential to the point of sale terminal.

6. The method of claim 5, further comprising:
generating, by the user computing device, a third storage ENC key and a third storage MAC key based on at least the second device fingerprint of the user computing device and the storage root key, wherein the third storage ENC key is used to re-encrypt the account payload and the third storage MAC key is used to generate a third keyed-hash message authentication code.

7. The method of claim 1, further comprising:
generating, by the user computing device, the device fingerprint of the user computing device.

8. A system comprising:
a user computing device comprising a processor and a memory;
machine-readable instructions stored in the memory that, when executed by the processor, cause the processor of the user computing device to at least:
receive a payment request from a point of sale terminal;
obtain, from a secure database of the user computing device, a storage encryption (ENC) key based on at least a device fingerprint of the user computing device, a keyed-hash message authentication code previously generated via a storage message authentication code (MAC) key comprising a numerical value based at least in part on the device fingerprint, and a storage root key;
obtain an encrypted account payload from the secure database of the user computing device;
generate a second device fingerprint of the user computing device;
generate a second storage ENC key and a second storage MAC key based on the second device fingerprint and the storage root key;
match the second storage ENC key to the storage ENC key;
decrypt the encrypted account payload using the second storage ENC key based on the matching, wherein the decrypted account payload includes a payment credential;
generate a second keyed-hash message authentication code based on the decrypted account payload and the second storage MAC key;

verify the keyed-hash message authentication code by matching the keyed-hash message authentication code to the second keyed-hash message authentication code; and transmit the payment credential to the point of sale terminal based on the verifying.

9. The system of claim 8, wherein the machine-readable instructions further cause the processor of the user computing device to:

obtain the storage MAC key from the secure database; and validate the decrypted account payload by matching the second storage MAC key to the storage MAC key.

10. The system of claim 9, wherein the decrypted account payload is validated before the payment credential is transmitted to the point of sale terminal.

11. The system of claim 9, wherein the storage MAC key comprises the numerical value based on the numerical value contained within the device fingerprint.

12. The system of claim 8, wherein the machine-readable instructions further cause the processor of the user computing device to:

re-encrypt the decrypted account payload for storage in the secure database of the user computing device after transmitting the payment credential to the point of sale terminal.

13. The system of claim 12, wherein the machine-readable instructions further cause the processor of the user computing device to:

generate a third storage ENC key and a third MAC key based on at least the second device fingerprint of the user computing device and the storage root key, wherein the third storage ENC key is used to re-encrypt the account payload and the third MAC key is used to generate a third keyed-hash message authentication code.

14. The system of claim 8, wherein the machine-readable instructions further cause the processor of the user computing device to:

generate the device fingerprint of the user computing device.

15. A non-transitory computer readable storage medium having instructions stored thereon that, when executed by a processor of a user computing device, cause the processor of the user computing device to at least:

receive a payment request from a point of sale terminal;

obtain, from a secure database of the user computing device, a storage encryption (ENC) key based on at least a device fingerprint of the user computing device, a keyed-hash message authentication code previously generated via a storage message authentication code (MAC) key comprising a numerical value based at least in part on the device fingerprint, and a storage root key;

obtain an encrypted account payload from the secure database of the user computing device;

generate a second device fingerprint of the user computing device;

generate a second storage ENC key and a second storage MAC key based on the second device fingerprint and the storage root key;

match the second storage ENC key to the storage ENC key:

decrypt the encrypted account payload using the second storage ENC key, based on the matching, wherein the decrypted account payload includes a payment credential;

generate a second keyed-hash message authentication code based on the decrypted account payload and the second storage MAC key;

verify the keyed-hash message authentication code by matching the keyed-hash message authentication code to the second keyed-hash message authentication code; and transmit the payment credential to the point of sale terminal based on the verifying.

16. The computer readable storage medium of claim 15, wherein the instructions further cause the processor of the user computing device to:

obtain the storage MAC key from the secure database; and validate the decrypted account payload by matching the second storage MAC key to the MAC storage key.

17. The computer readable storage medium of claim 16, wherein the decrypted account payload is validated before the payment credential is transmitted to the point of sale terminal.

18. The computer readable storage medium of claim 15, wherein the instructions further cause the user computing device to:

re-encrypt the decrypted account payload for storage in the secure database of the user computing device after transmitting the payment credential to the point of sale terminal.

19. The computer readable storage medium of claim 18, wherein the instructions further cause the user computing device to:

generate a third storage ENC key and a third storage MAC key based on at least the device fingerprint of the user computing device and the storage root key, wherein the third storage ENC key is used to re-encrypt the account payload and the third storage MAC key is used to generate a third keyed-hash message authentication code.

20. The computer readable storage medium of claim 15, wherein the instructions further cause the user computing device to:

generate the device fingerprint of the user computing device.

* * * * *